(12) United States Patent
Liebmann et al.

(10) Patent No.: US 8,930,689 B2
(45) Date of Patent: Jan. 6, 2015

(54) SECURING EMAIL CONVERSATIONS

(75) Inventors: Nicholas Liebmann, Watford (GB); Graeme McKerrell, Hemel Hempstead (GB); Peter Neal, Oxford (GB)

(73) Assignee: McAfee, Inc., Santa Clara, CA (US)

( * ) Notice: Subject to any disclaimer, the term of this patent is extended or adjusted under 35 U.S.C. 154(b) by 121 days.

(21) Appl. No.: 13/247,239

(22) Filed: Sep. 28, 2011

(65) Prior Publication Data

US 2013/0080775 A1 Mar. 28, 2013

(51) Int. Cl.
*H04L 9/00* (2006.01)
*H04L 12/58* (2006.01)
*H04L 29/06* (2006.01)

(52) U.S. Cl.
CPC ............ *H04L 12/58* (2013.01); *H04L 63/0471* (2013.01)
USPC ........................................................ 713/154

(58) Field of Classification Search
USPC .................. 713/168, 150, 153, 154
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,807,182 B1 | 10/2004 | Dolphin et al. | |
| 7,089,174 B2 | 8/2006 | Ishtiaq et al. | |
| 7,506,155 B1 | 3/2009 | Stewart et al. | |
| 2004/0167766 A1 | 8/2004 | Ishtiaq et al. | |
| 2005/0138353 A1* | 6/2005 | Spies et al. ..................... | 713/153 |
| 2005/0160292 A1* | 7/2005 | Batthish et al. ................ | 713/201 |
| 2007/0294390 A1* | 12/2007 | Willey ........................... | 709/224 |
| 2008/0187140 A1* | 8/2008 | McGillian et al. ............. | 380/278 |
| 2008/0235336 A1* | 9/2008 | Stern et al. ..................... | 709/206 |
| 2009/0063647 A1 | 3/2009 | Backholm et al. | |
| 2010/0057866 A1 | 3/2010 | Bauchot et al. | |
| 2010/0217969 A1* | 8/2010 | Tomkow ........................ | 713/150 |
| 2011/0202756 A1* | 8/2011 | West .............................. | 713/152 |
| 2011/0208960 A1* | 8/2011 | Flood ............................. | 713/153 |

FOREIGN PATENT DOCUMENTS

| | | |
|---|---|---|
| JP | 2002-073475 A | 3/2002 |
| JP | 2009-188960 A | 8/2009 |
| WO | WO 2013/049078 A1 | 4/2013 |

OTHER PUBLICATIONS

International Search Report and Written Opinion mailed Feb. 26, 2013 for International Application No. PCT/US2012/057147.
International Preliminary Report on Patentability for International Application No. PCT/US2012/057147, mailed Apr. 1, 2014, 6 pages.

* cited by examiner

*Primary Examiner* — Ellen Tran
(74) *Attorney, Agent, or Firm* — Patent Capital Group

(57) ABSTRACT

At least a portion of a transmission of an outgoing first email from a first email account to at least a second email account is encrypted. Second email address data is changed corresponding to the second email account to cause replies to the first email intended for the second email account to be sent to an intermediate device prior to being routed to the second email account. Replies to the first email are then sent to the intermediate device and sent over one or more encrypted channels. Replies to the first email including the changed email address data are decoded to identify the second email address data associated with the second email account. A reply to the first email is then sent to the second email account based on the identified second email address data.

25 Claims, 12 Drawing Sheets

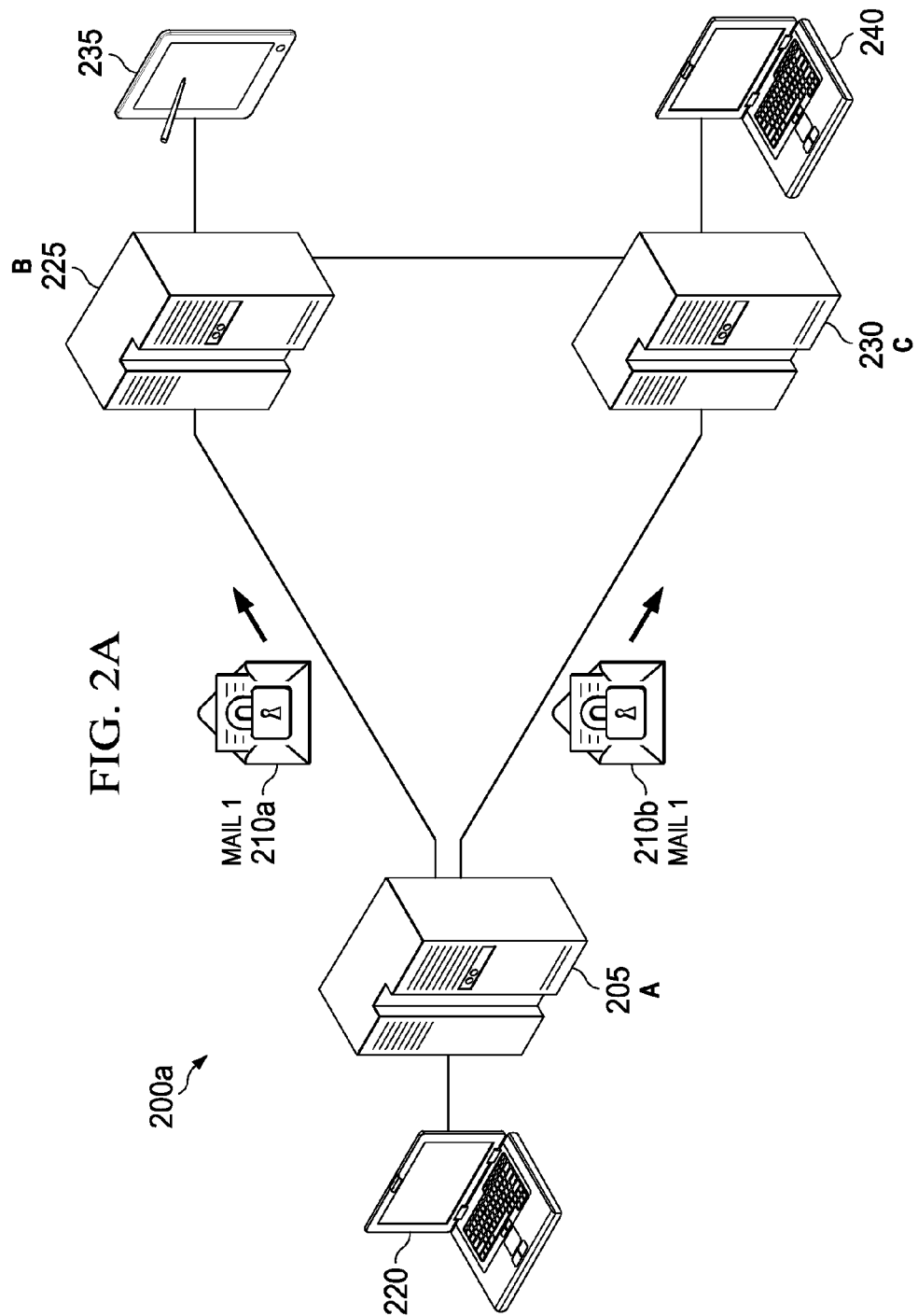

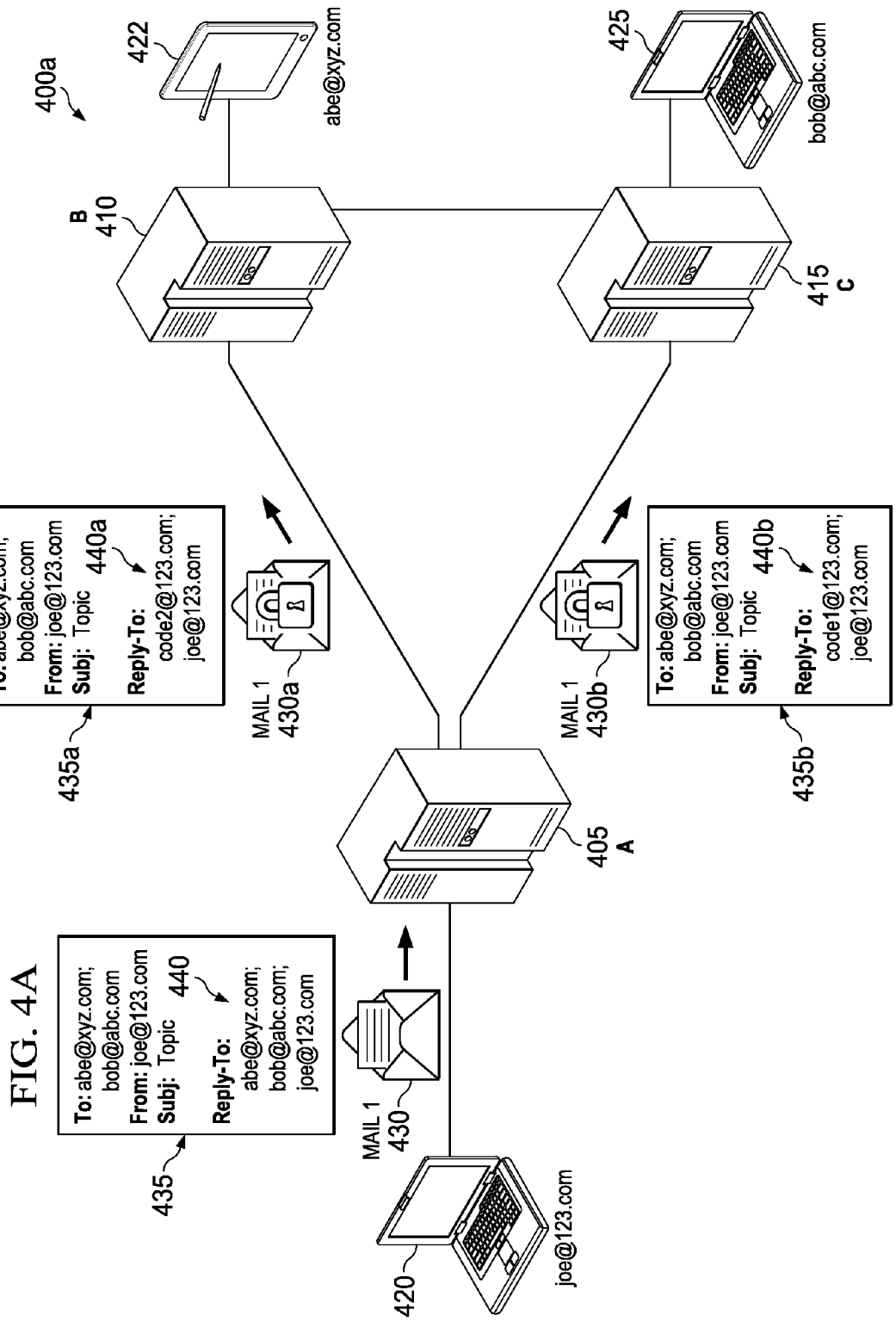

SECURING EMAIL CONVERSATIONS

TECHNICAL FIELD

This disclosure relates in general to the field of computer security and, more particularly, to security of email communications.

BACKGROUND

The Internet has enabled interconnection of different computer networks all over the world. The ability to effectively protect and maintain stable computers and systems, however, presents a significant obstacle for component manufacturers, system designers, and network operators. Email and other electronic communications can be a source of security threats and vulnerabilities, not only through the potential introduction of malware (e.g., via email attachments, etc.), but also from the standpoint of accidental and malicious disclosures of confidential and other sensitive data via email. For instance, email is frequently used to communicate important information, documents, and files between and within organizations. Encryption of the email data, attachments, and/or the data stream over which email data is sent have been used to assist in protecting email content from falling into the wrong hands. In some instances, however, once an email has been sent to a recipient, the sender loses a measure of control over the sent email and its contents. In many instances, the sender then relies entirely on the trustworthiness and vigilance of the recipient to protect and guard against the forwarding of the email contents using unsecure channels or to untrusted or unauthorized third parties.

BRIEF DESCRIPTION OF THE DRAWINGS

FIGS. 2A-2B illustrate examples of typical communications in a traditional email environment;

FIGS. 4A-4B illustrates examples of performing example email security tasks in accordance with at least some embodiments;

Like reference numbers and designations in the various drawings indicate like elements.

DETAILED DESCRIPTION OF EXAMPLE EMBODIMENTS

Overview

Figure 1:
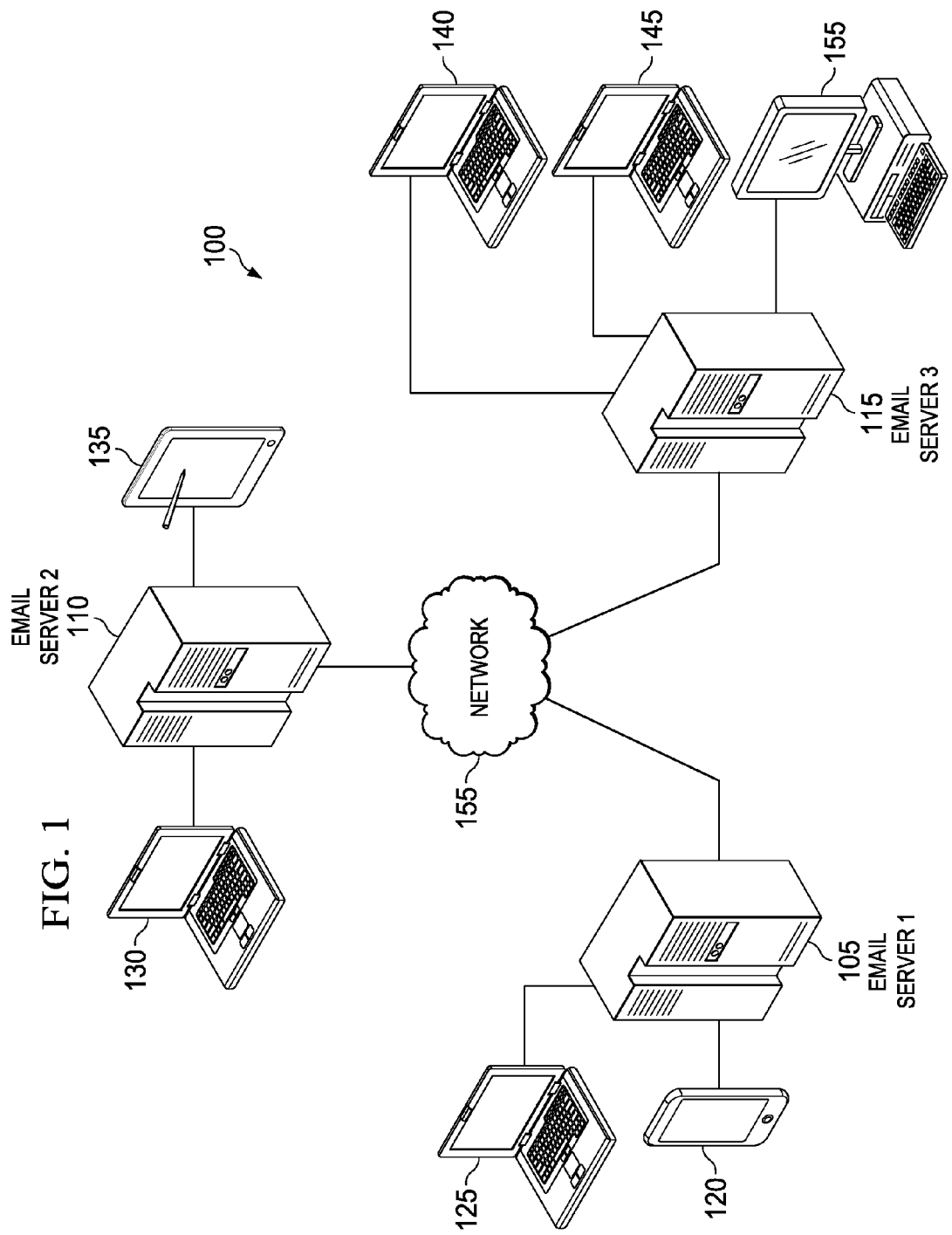
FIG. 1 is a simplified schematic diagram of a system including one or more email servers and two or more email clients in accordance with one embodiment.

In general, one aspect of the subject matter described in this specification can be embodied in methods that include the actions of determining that at least a portion of a transmission of an outgoing first email from a first email account to at least a second email account is to be encrypted. Second email address data can be changed corresponding to the second email account to cause replies to the first email intended for the second email account to be sent to an intermediate device prior to being routed to the second email account. Replies to the first email can then be sent to the intermediate device and sent over one or more encrypted channels. At least a portion of a transmission of the first email can be caused to be encrypted and sent to the second email account.

In another general aspect of the subject matter described in this specification, a system can include a memory element storing data, a processor operable to execute instructions associated with the stored data, and an email security engine. The email security engine can be configured to determine that at least a portion of a transmission of an outgoing first email from a first email account to at least a second email account is to be encrypted, change second email address data corresponding to the second email account to cause replies to the first email intended for the second email account to be sent to an intermediate device prior to being routed to the second email account, so that replies to the first email are sent over encrypted channels, and cause at least a portion of a transmission of the first email to be encrypted and sent to the second email account. In some aspects, the system can further include an email server that includes the email security engine.

These and other embodiments can each optionally include one or more of the following features. The first email can be sent to both the second email account and at least a third email account, where the third email address data can be changed corresponding to the third email account to cause replies to the first email intended for the third email account to be sent to the intermediate device prior to being routed to the third email account so that the encrypted portion of the transmission of the first email is sent to the third email account. Email transmissions can be capable of being secured between a first server associated with the first email account and each of a second server associated with the second email account and a third server associated with the third email account, where at least some email transmissions are not secured between the second server and the third server. At least one copy of a reply to the previously-sent first email can be received from the second email account, the at least one copy including the changed third email address data. At least a portion of the changed third email address data can be decoded to identify an email address associated with the third email account. The at least one copy can be caused to be forwarded to the third email client over a secured communication channel. Email address data corresponding to the first email account can be changed to cause replies to the first email intended for the first email account to be sent to the intermediate device prior to being routed to the first email account. The intermediate device can be used to serve email associated with first email account. The intermediate device can be at least partially independent from an email server of the first email account.

Further, these and other embodiments can each optionally include one or more of the following features. Changing second email address data can include encoding a local portion of an email address of the second email account. Encoding the local portion of the email address of the second email account can include hashing the email address, encrypting the email address, and/or converting the email address into a text string. Changing the second email address data can include changing a domain portion of an email address of the second email account to a particular domain associated with the intermediate device. The transmission of the first email can include transmission of the changed second email address data. Changing second email address data can include setting a reply-to email address data field to address data corresponding to the intermediate device. The second email address data can be changed in response to determining that at least a portion of a transmission of an outgoing first email from a first email account to at least a second email account is to be encrypted.

In another general aspect, subject matter described in this specification can be embodied in methods that include the actions of receiving at least one copy of a reply to a previously-sent first email intended for a first email client, the at least one copy including encoded email address data associated with the first email client and adapted to route the at least one copy to an intermediate device over a first secured communication channel based on the encoding. At least a portion of the encoded email address data can be decoded to identify an email address associated with the first email client. The at least one copy can be caused to be forwarded to the first email client over a second secured communication channel. In some aspects, at least a portion of the encoded email address data can be encrypted and decoding the portion of the encoded email address data includes decrypting the encrypted portion of the encoded email address data. Additionally, in some aspects, at least a portion of the encoded email address data can be a hash of the email address associated with the first email client. Further, in some aspects, the encoded email address data can be generated in response to a determination that the first email was to be transmitted at least partially over a secured communication channel.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram illustrating an example embodiment of a computing system 100 including one or more email servers 105, 110, 115 adapted to facilitate email communications exchanged by one or more endpoint devices, including devices with email clients, such as endpoint devices 120, 125, 130, 135, 140, 145, 150 over one or more networks 155. In some implementations, one or more of email servers 105, 110, 115 can be adapted to facilitate encryption of email processed using the email server, including the establishing of encrypted or otherwise secure communication channels between clients during the exchanging emails. For instance, a first email server (e.g., 105) can be used to send an email from a first client (e.g., 120) to another email server (e.g., 115) over an encrypted or otherwise secure communication channel. The recipient email server (e.g., 115) can then be used to deliver the email to the email mailbox associated with one or more recipient clients (e.g., 140). In some instances, encrypted email communication channels and other security measures and policies can be negotiated between servers of different entities or administrators to ensure a level of security for emails exchanged between the servers. For instance, a manufacturing company may negotiate the provision of an encrypted channel between the manufacturing company and a retailing company with whom it frequently does business and exchanges email. Such an encrypted channel can be used to encrypt at least some email traffic exchanged between email servers of both the manufacturer and the retailer, as an example.

One or more of email servers 105, 110, 115 can be further adapted to assist in establishing, managing, and facilitating encrypted communication between it and other email servers. Email servers 105, 110, 115 can include devices embodying mail transfer agents (MTAs) or mail relays, including SMTP, POP, IMAP, Exchange, and other email server types and implementations. Email servers can communicate with other email servers over one or more networks (e.g., 155) and access, accept, deliver, and otherwise process email and email-related communications. Additionally, email servers can communicate with, receive emails from, forward emails to, and manage email mailboxes of email clients. Email clients can include devices (e.g., endpoint devices 120, 125, 130, 135, 140, 145, 150) implementing an email client, email reader, or mail user agent (MUA). Further, email servers can communicate with other devices, systems, and tools, including devices implementing mail submission agents (MSAs), among other examples. Further, in some instances, email servers (as well as email clients) can share functionality with or be combined with other devices and tools, including email clients, among other examples.

In general, "servers," "clients," "devices," "endpoints," "computers," and "computing devices" (e.g., 105, 110, 115, 120, 125, 130, 135, 140, 145, 150) can comprise electronic computing devices operable to receive, transmit, process, store, or manage data and information associated with the software system 100. As used in this document, the term "computer," "computing device," "processor," or "processing device" is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Servers, clients, and computing devices (e.g., 105, 110, 115, 120, 125, 130, 135, 140, 145, 150) can each include one or more processors, computer-readable memory, and one or more interfaces. Servers can include any suitable software component or module, or computing device(s) capable of hosting and/or serving software applications and other programs, including distributed, enterprise, or cloud-based software applications. For instance, application servers can be configured to host, serve, or otherwise manage web services or applications, such as SOA-based or enterprise web services, or applications interfacing, coordinating with, or dependent on other enterprise services, including security-focused applications. In some instances, some combination of servers can be hosted on a common computing system, server, or server pool, and share computing resources, including shared memory, processors, and interfaces, such as in an enterprise software system serving services to a plurality of distinct clients and customers.

Computing devices (e.g., 120, 125, 130, 135, 140, 145, 150) in system 100 can also include devices implemented as one or more local and/or remote client or endpoint devices, such as personal computers, laptops, smartphones, tablet computers, personal digital assistants, media clients, web-enabled televisions, telepresence systems, and other devices adapted to receive, view, compose, send, or otherwise participate in an email communication. A client or endpoint devices can include any computing device operable to connect or communicate at least with servers, other endpoint devices, network 155, and/or other devices using a wireline or wireless connection. Each endpoint device can include at least one graphical display device and user interfaces, allowing a user to view and interact with graphical user interfaces of computer security tools and other software. In general, endpoint devices can include any electronic computing device operable to receive, transmit, process, and store any appropriate data associated with the software environment of FIG. 1. It will be understood that there may be any number of endpoint devices associated with system 100, as well as any number of endpoint devices external to system 100. Further, the term "client," "endpoint device," and "user" may be used interchangeably as appropriate without departing from the scope of this disclosure. Moreover, while each endpoint device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Traditional email systems can provide for encryption and secure communication between email servers and endpoints. For instance, in a first example, shown in FIGS. 2A-2B, a first email server A (205) can be used to send, forward, or otherwise process the delivery of an email 210a-b from an email account (and mailbox) accessed through a first client device 215 to other email mailboxes handled by email servers B and C (225 and 230 respectively). For instance, the sender of email 210a-b may have designated multiple recipients for the email, including recipient email mailboxes served or otherwise managed using two different email servers 225, 230. Accordingly, in this example, delivery of email copy 210a to email server B (225) is sent over a first secured channel between email server A (205) and email server B (225). Further, delivery of email copy 210b to email server C (230) is sent over a first secured channel between email server A (205) and email server C (230). Using such techniques, an email 210a-b can be delivered to recipient clients 235, 240 over a reasonably secured channel.

Figure 2B:
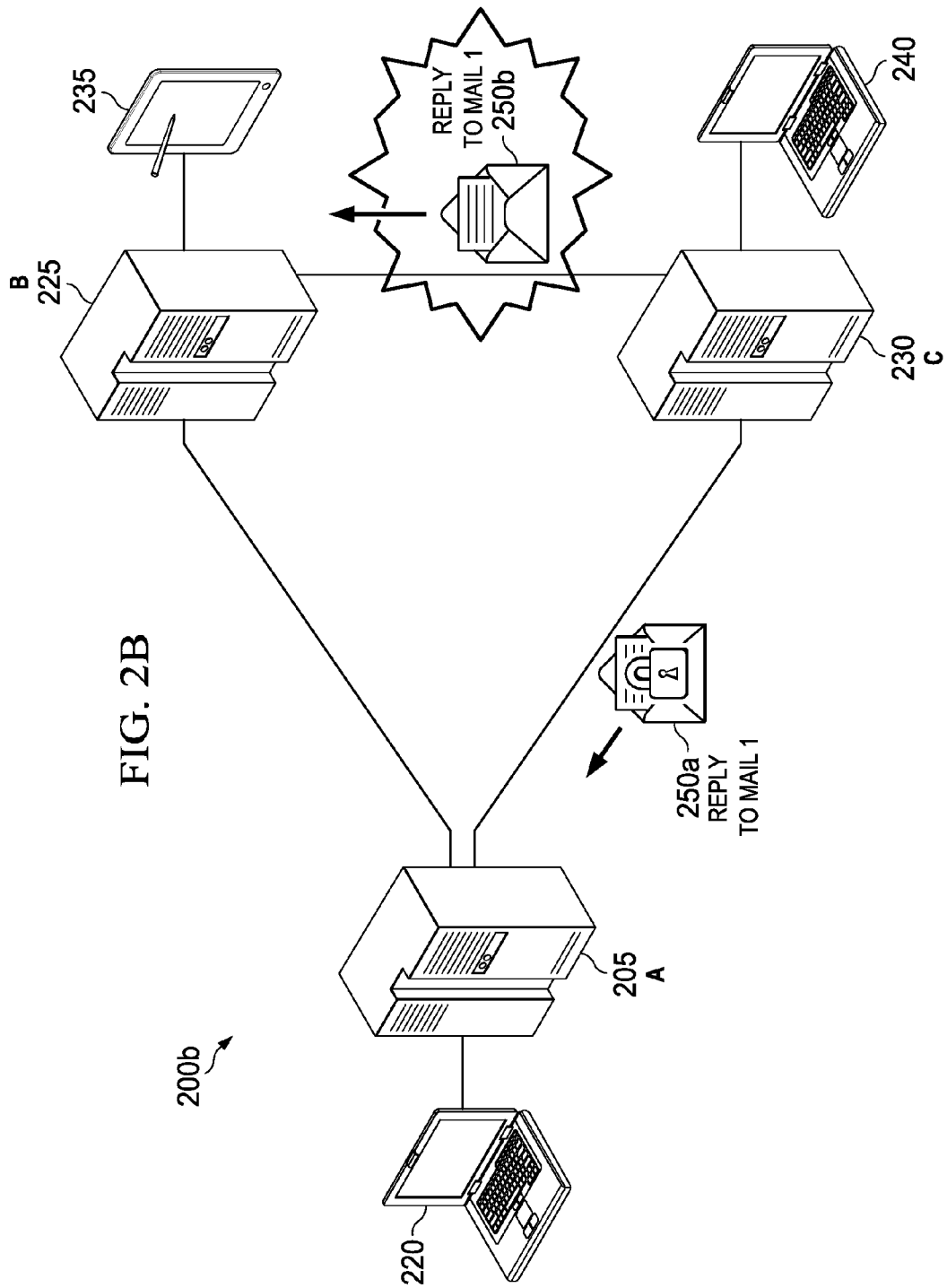

Turning to FIG. 2B, as is typical in modern email (and other text-based electronic) communications, a recipient of email 210a-b can elect to reply to the email 210a-b, causing a reply email to be generated and communicated. In some instances, a recipient of an email (e.g., 210a-b) can elect to reply to the sender of the email as well as one or more additional recipients other than the original sender, including other recipients of the original email. A popular and convenient action for replying to an email is to "reply-all," causing a copy of a reply email to be sent to the original sender as well as any other recipients of the original email. For instance, in the example of FIG. 2B, a user of client device 240 replies-all to email 210b causing email server C (230) to send reply emails 250a, 250b to the sender (e.g., client 220) as well as other recipients (e.g., client 235). In the case of the copy 250a of the reply email sent to the sender 220 (via email server 205), a secured channel used to originally deliver the email 210b to email server C (230) from email server A (205) can be established and used again to communicate the copy 250a of the reply email (e.g., based on a pre-established protocol, negotiation, relationship, or other arrangement between servers A and C).

On the other hand, in the particular example of FIG. 2B, while secured email communication channels existed between server A (205) and each of server B (225) and C (230) (and vice versa), no such arrangement may exist between email servers of the respective recipients (e.g., between email servers B and C). This can present a problem, for instance, when either user 235 or user 240 attempts to reply or reply-all to the email 210a-b. In the present example of FIG. 2B, encryption or security measures may not exist, or be of a lower quality or standard (or a standard not in compliance with policies or preferences of the original sender (e.g., 205)), than that employed during the sending of the original email 210a-b. Accordingly, when user 240 replies-all to email 210a-b and a reply 250b is sent to server B (225), the copy 250b of the reply email may not be adequately encrypted or otherwise secured, relative to the original email 210a-b. This can result in a "hole" in security, potentially resulting in content of email 210a-b being compromised (through reply email 250a-b), notwithstanding the original efforts to encrypt and protect the content of email 210a-b.

Computing system 100, in some implementations, can resolve many of the issues identified above pertaining to the security of email communications. As an example, in the schematic representation 305 of FIG. 3, an email server 305, including at least one processor 310 and memory 315, can be provided with security engine 320 for use in connection with realizing email security of email processed in connection with email server 305. Email server 305 can be used to send, forward, and receive emails from one or more client devices, including devices 325, 330, and communicate with other email servers (e.g., 335, 340) over one or more networks 155, so as to permit devices 325, 330 to communicate email with other email client devices (e.g., devices 345, 350, 355, 360). Security engine 320 can further include modules 365, 370, 375, 380 for performing various tasks in connection with the securing of emails sent, forwarded, or received using email server 305.

Figure 3:
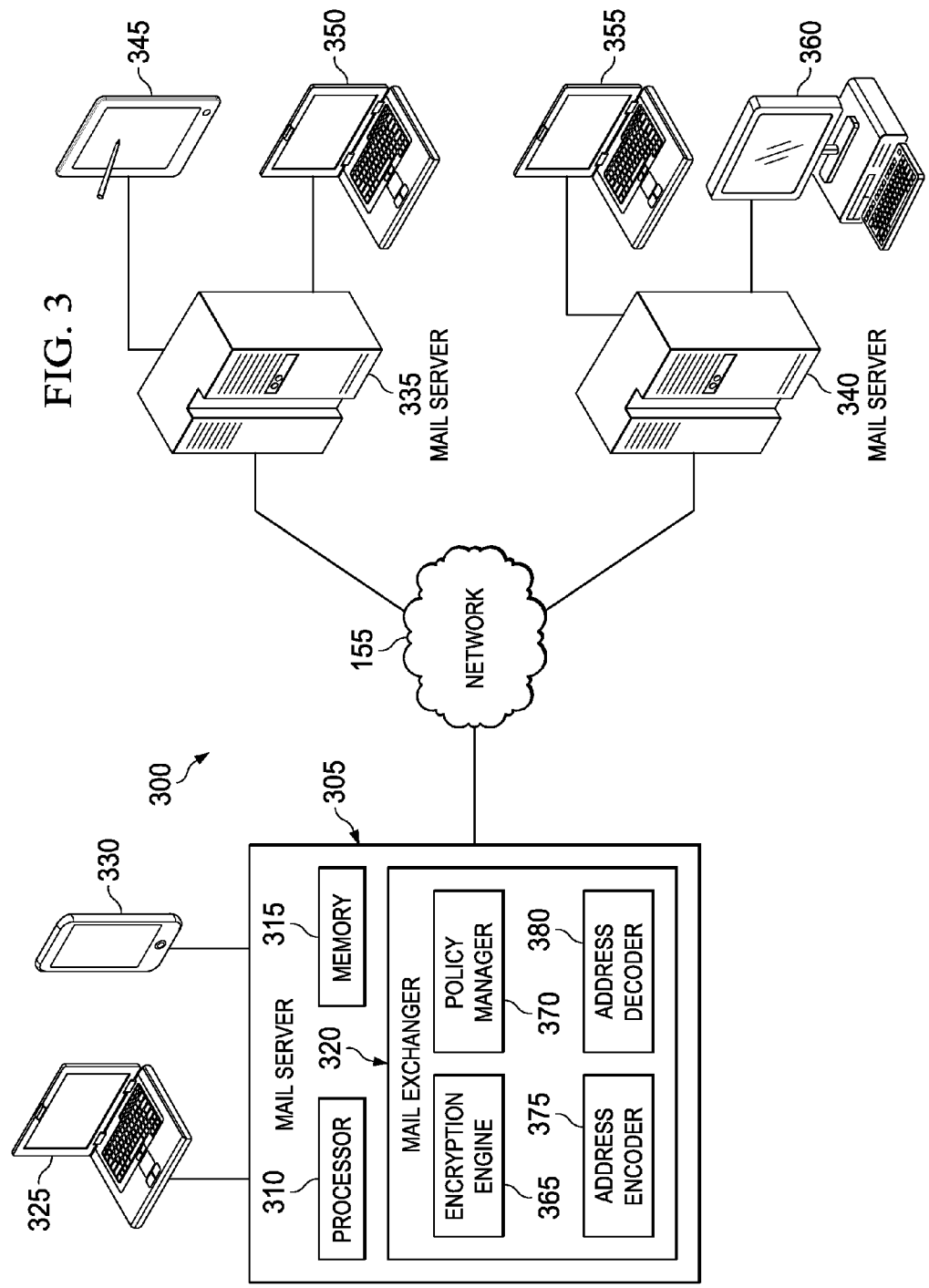
FIG. 3 is a simplified block diagram of an example system including an example email server adapted to perform email security tasks in accordance with one embodiment.

Among the modules and functionality provided through the particular example of security engine 320 illustrated in FIG. 3, security engine 320 can include an encryption engine 365, policy manager 370, address encoder 375, and address decoder 380, among other examples and combinations thereof. An encryption engine 365 can be used to encrypt emails processed using email server 305. Such encryption techniques can include mail session encryption, public-key encryption techniques, and other suitable encryption techniques. Emails can also be secured through other approaches, such as storing the email on a secure web server and sending the recipients a link to the stored email that prompts the recipients to authenticate themselves before being able to view the email in a web-based mail client. Alternative security techniques can be provided using encryption engine 365 in addition to or other than encryption. Email communications sent or routed through email server 305 can be encrypted or otherwise secured according to particular email policies. Such email policies can be maintained, communicated, defined, edited, enforced, and otherwise managed using policy manager 370. For instance, emails from particular senders (e.g., a CEO, in-house council, etc.), to particular recipients, including certain attachments, words, phrases, or other content can be encrypted or otherwise secured according to particular predefined policies and rules. For instance, sender and recipient email fields, as well as subject, body, and attachment fields can be scanned against particular policies to determine whether a particular email should be encrypted. For instance, a policy can dictate that emails including content with particular words such as "confidential," "top secret,"

"privileged," etc. be encrypted. Further, policies can further define the type of encryption or security provisions that can be employed, automatically, to emails sent or otherwise handled by a server, for instance, when particular conditions are met. For instance, under some conditions, an email can be encrypted over a channel using a first encryption technique, while under other conditions, an email can be encrypted using a different encryption technique. Indeed, in some instances, email server 305 can adopt and apply a first encryption technique or protocol for emails sent over a channel to a second email server (e.g., server 335), while applying a second, different encryption technique for emails exchanged with a third email server (e.g., server 340).

In some implementations, security engine 320 can include an address encoder 375 adapted to modify email address data in connection with particular security protocols. For example, in response to an encryption of a particular email sent to another email server (e.g., 335, 340) using email server 305, email address data included in the email, such as an email header, can be dynamically altered using address encoder 375 to promote the re-routing of particular replies to the email through the email server 305, another email server, or a particular channel, so as to permit replies to the email to be handled using similar encryption and security techniques and protocols as the original email. For example, a "Reply-To" field included in a header of the email can, by default, include the addresses of the recipient email accounts. If it is determined that the email is to be encrypted or secured, however, the original email address data, such as reply-to data specifying the original recipient and sender email addresses) can be changed to email addresses that correspond with email servers, networks, or other devices capable of re-securing replies to the email.

"Reply-To" header field data is but a single example of email address data that can be used modify in connection with preserving securing email replies. For instance, email address data can be included in a variety of other mail header fields and formats. Such email address data can be encoded rather than presenting the original mail addresses (i.e., to prevent inadvertent use of the original email addresses in replies to the email). Such email address data can include fields such as Reply-To, Envelope-From, Return-Path, Sender, etc. Indeed, any headers defined in RFC 2822 and RFC 822 that include email addresses may be suitable to encode and modify in connection with the attempting to secure email replies. Further, in certain instances, the altered email address data can be altered so as to be encoded with data that can be used to identify the actual, intended recipients of an email reply and complete routing of the email replies to the intended recipients' email servers. For instance, a local part of an email address (e.g., the portion of the email address preceding the "@" sign) can be altered and generated, using address encoder 375, to specify the intended recipient(s) of an email reply, while the domain part of the email address (e.g., the portion of the email address following the "@" sign) is altered for use in routing any replies to the email to a server or device capable of encrypting the email replies.

Security engine 320 can additionally be equipped with an address decoder 380 for use in decoding or otherwise interpreting encoded email address data included in replies to an email. In some instances, recipients of an email with encoded address data (such as with altered or encoded reply-to fields) may not be aware of the encoding. Indeed, fields presented to a user in connection with a reply to an email, may appear to function as a typical email reply (e.g., showing the email addresses, alias, etc. of the sender and other recipients in the "To," "CC," and "BCC" fields presented in the email clients of the replying user) notwithstanding the altered email address data. This can be accomplished, for example, by generating and displaying an alias or other data indicating the ultimate destination of the reply emails, while hiding the reality that the email replies will be sent, or routed, first to an intermediate server for encryption before being routed to the endpoint recipient. Hiding the altered email address data can be useful in preventing end users from questioning why the altered email address data differs from expected email address data and attempting to circumvent security measures (if only inadvertently) by undoing the encoding of the email address data. Additionally, in some instances, encoded email addresses can obfuscate the format and purpose of the encoding, for instance, through a hash or encryption of at least part of the altered email address data. This can assist in preventing unscrupulous users or sniffing tools from mimicking the encoding of email address data to take unauthorized advantage of encryption techniques and tools of the security engine 320. Additionally, in such instances, address decoder 380 can be used to interpret hashed, encrypted, or otherwise obfuscated data so that reply emails can be eventually routed to their intended destinations.

In accordance with the above, FIGS. 4A-5C illustrate the performing of example email security tasks on virtual machines and other resources. For instance, in FIG. 4A, a schematic representation 400*a* is shown illustrating an email server 405 managing email reply security in a system including one or more other email servers 410, 415 and email client devices 415, 420, 425. In the example of FIG. 4A, an email client device 420 causes as email 430 to be sent using email server A 405. Email server A 405 can identify email servers B (410) and C (415) as corresponding to recipient email accounts (e.g., "abe@xyz.com" and "bob@abc.com") designated in email 430. Email server A 405 can further determine that email 430 should be encrypted and identify encryption protocols in place between email server A 405 and each of email servers B 410 and C 415, permitting encrypted transmission of email 430 to each of email servers B (410) and C (415).

In connection with the determination that email 430 is to be encrypted, email server A 405 can perform techniques for protecting against unsecured replies to email 430. For instance, email server A 405 can identify email address data (e.g., reply-to address data 440 in email header data 435) that can be used by recipient email clients (e.g., 420, 425) in determining addresses of recipients of replies to email 430. In this example, email server A 405 encrypts email 430 and changes address data (at 435*a-b*) to assist in returning control of the routing of replies to email 430 to email server A 405, allowing email server A to control encryption and security of reply emails. For instance, in this particular example, reply-to address data 440*a-b* has been altered so that each reply-to address is pointed to a domain "123.com" corresponding to a domain of email server 405 providing security for the email replies. For example, the reply-to data 440*b* of emails destined for client 425 have been changed from "abe@xyz.com" to "<code1>@123.com."<code1> can be a hashed, encrypted, or otherwise encoded version of the recipient's (e.g., 422) email address (e.g., "abe@xyz.com"), for instance, assisting email server 405 in determining the ultimate destination of the email. Similarly, <code2> can be an encoded version of the other recipient's e.g., 425) actual email address (e.g., "bob@abc.com"). Further, while in the example of FIG. A, address data corresponding to the sender (e.g., joe@123.com) has not been altered (i.e., because the email would be routed back through email server 405 by default), in other examples, sender address data can also be altered and encoded, despite sharing the same email domain. For instance, in some examples, a sender's email address may be in a different domain than the domain providing security to the email communications (e.g. when a subsidiary company of a different name uses a parent company's mail server for outbound mail), and encoding the sender's address can allow replies addressed to the sender to be properly routed over the secure channel using the different domain (e.g., the parent company's server).

Figure 4B:
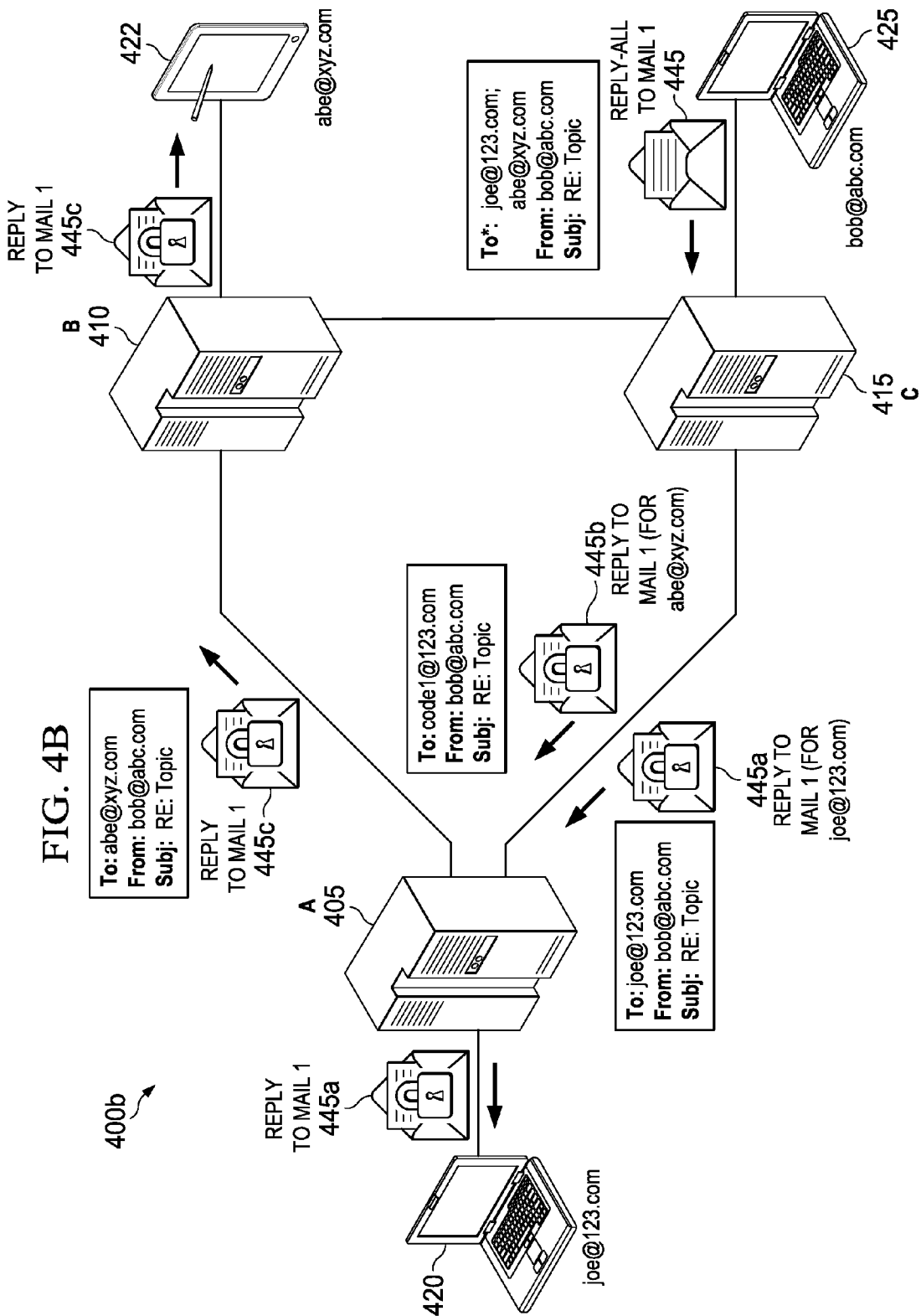

Turning to FIG. 4B, a reply-all email 445 is sent in reply to email 430 from client 425. In this example, replying to email 430 causes reply email copies 445a-b to be sent to the sender and other recipients of email 430 according to the reply-to address data 440a-b altered in connection with the encryption of email 430. Consequently, rather than reply emails 445a-b all being sent directly to email servers handling email mailboxes for the recipients' respective domains (e.g., @xyz.com handled by server B 410), reply emails 445a-b are routed to email server A 405, for instance, over the encrypted channel between server A 405 and server C 415 used to communicate email 430 from server A 405 to server C 415. Altered, or encoded, address data (e.g., 440b) can be interpreted by server A 405 to identify the ultimate destination of the reply email 445b. Accordingly, server A 405 can determine from altered address data that a copy of reply email 445b is to be forwarded to server B 410 for delivery to client 420. For instance, server A 405 can decode the address data to identify the actual address of the recipient (i.e., client 420). Additionally, server A 405 can forward the copy 445b of the reply email over the channel used to securely send the original email 430 from server A 405 to server B 410 (as shown and described in FIG. 4A). As a result, through the provision of altered address data, server A 405 was able to take ownership of the security of email 430 as well as at least one reply (445) thereto.

While the particular example of FIG. 4A-4B showed an email server directly serving email to clients being used to perform email security tasks, in alternate examples, other servers and devices, including remote and third-party servers, can be used to provide email security functionality. For instance, turning to the example of FIG. 5A, an encryption server 505 can be provided in addition to email servers A (405), B (410), and C (415), for use in encrypted email communications between two or more of email servers A, B, and C. Indeed, in the present illustrative example, an email 510 can be sent from client device 420, destined for email clients 420, 425 (or email accounts associated therewith). Email server 405 can handle forwarding of the email to email servers (e.g., 410, 415) associated with the email addresses (e.g., "abe@xyz.com" and "bob@abc.com"), as well as enforce email policies associated with a particular email account, network, system, enterprise, etc. For instance, email server 405 can identify that email 510 should be transmitted over an encrypted channel.

In this particular example, upon determining that email 510 should be encrypted, email server 405 can route the email 510 to an intermediate encryption server 505 (or other email security server or device) for encryption of the email communication 510. In addition to encrypting email 510, intermediate encryption server 505 can encode address data (e.g., data 520a in email header 515) to assist in redirecting replies to the email to similarly encrypted email communication channels. For instance, encryption server 505 can be associated with a "@890.com" domain, and change email address data 520a so that replies to email 510 are routed back through encryption server 505. Accordingly, copies 510a-b of email 510 can be included encoded email address data 520b. Further, encoded email address data 520b can be encoded so that the original email addresses of the sender and recipients of email 510 can be identified when included in corresponding reply emails.

Figure 5A:
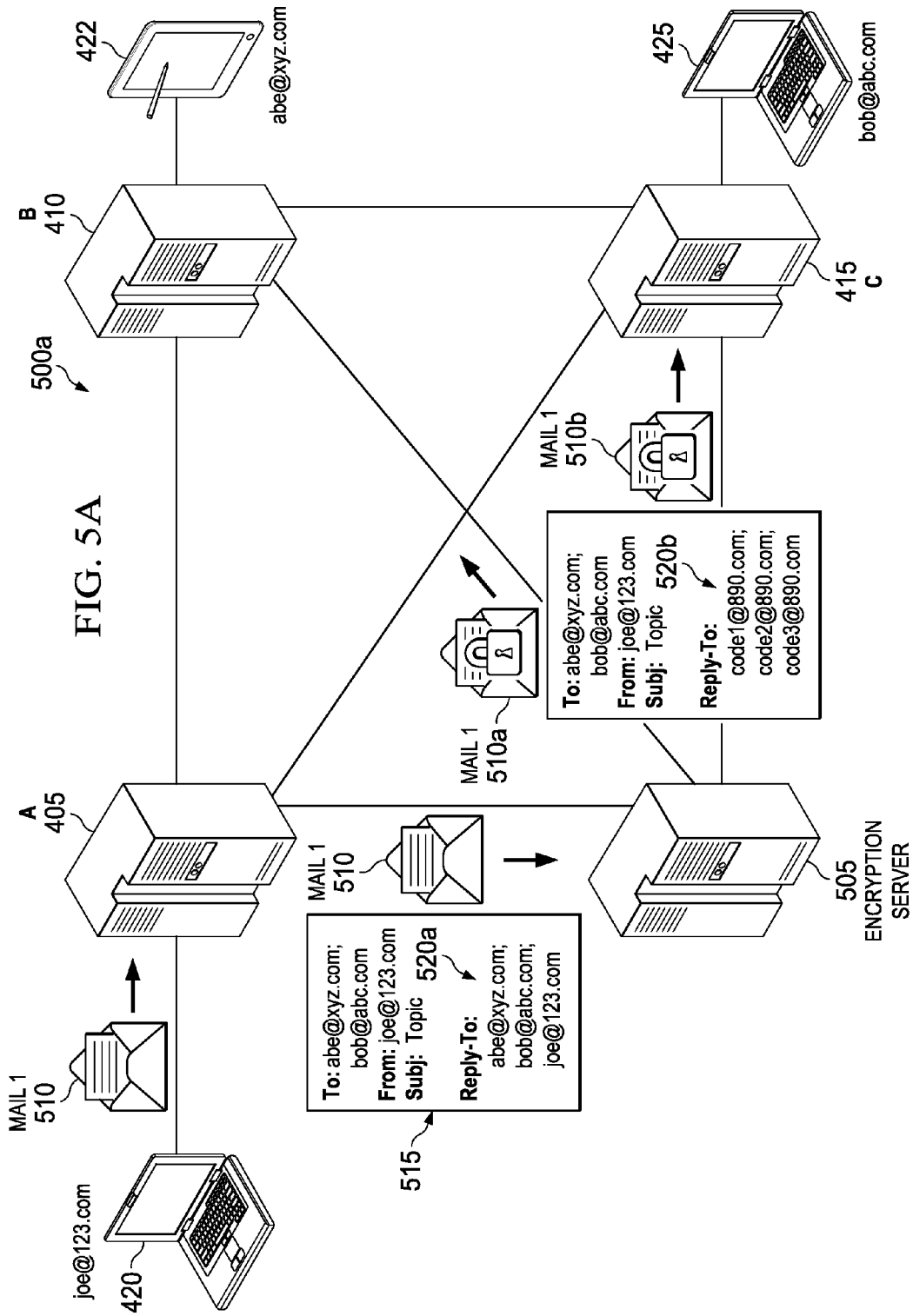
FIGS. 5A-5C illustrates other examples of performing example email security tasks in accordance with at least some embodiments.
Figure 5B:
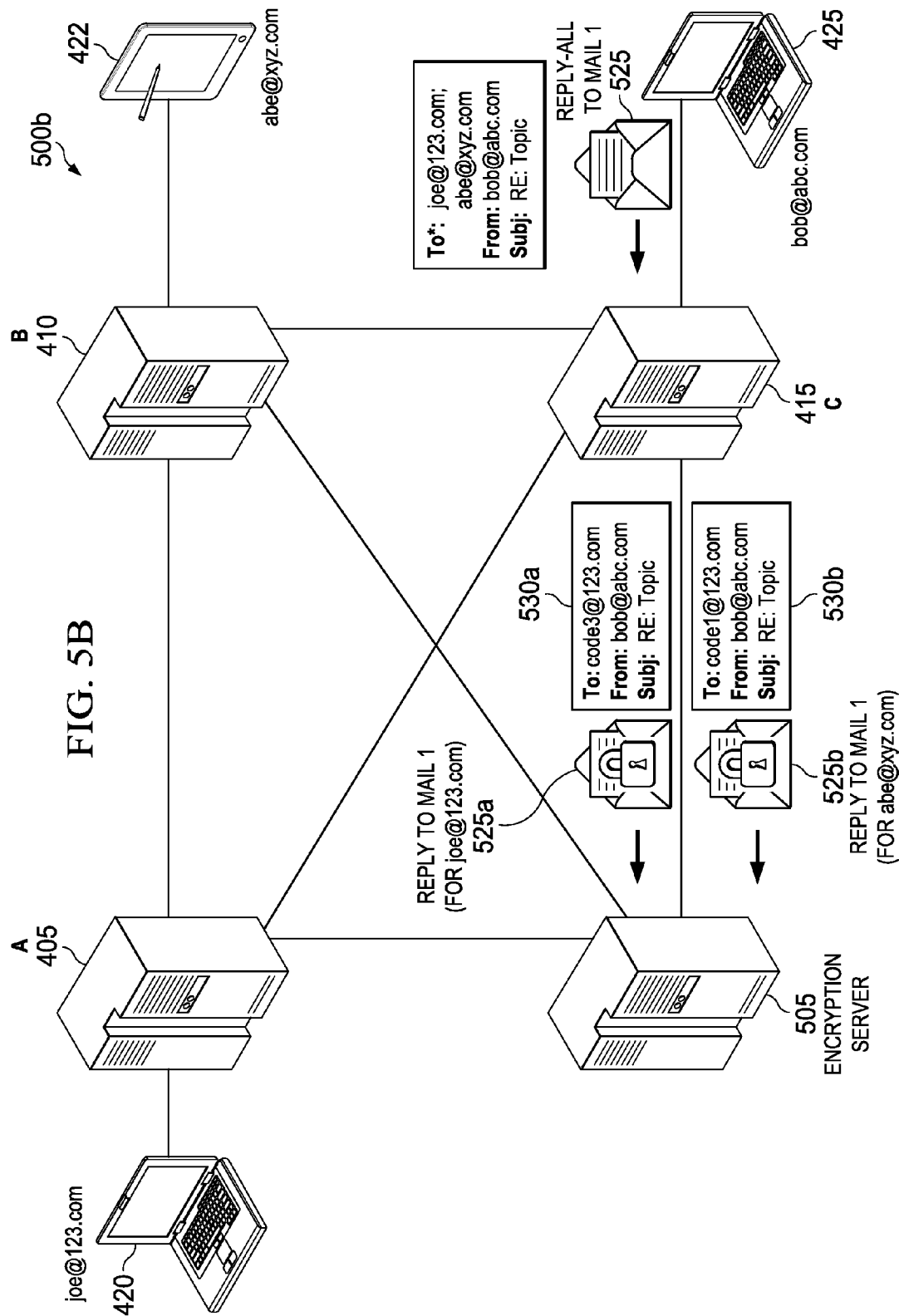

Turning to FIG. 5B, one of the recipients of email 510 can reply to the sender (i.e., 420) or other recipients of the email 510. As in the examples of FIGS. 4A-4B, replies to email 510 can cause reply emails 525 to be generated that include the encoded email address data generated by encryption server. Consequently, encoded email address data (e.g., shown at 530a-b) can be used in the routing of copies 525a-b of the reply email 525 to the respective recipient servers (e.g., 405, 410) via encryption server 505. Accordingly, encryption server 505 can be used to control and encrypt communication channels between encryption server 505 and email servers A, B, and C (405, 410, 415), to assist in preventing reply emails from being communicated unencrypted.

Figure 5C:
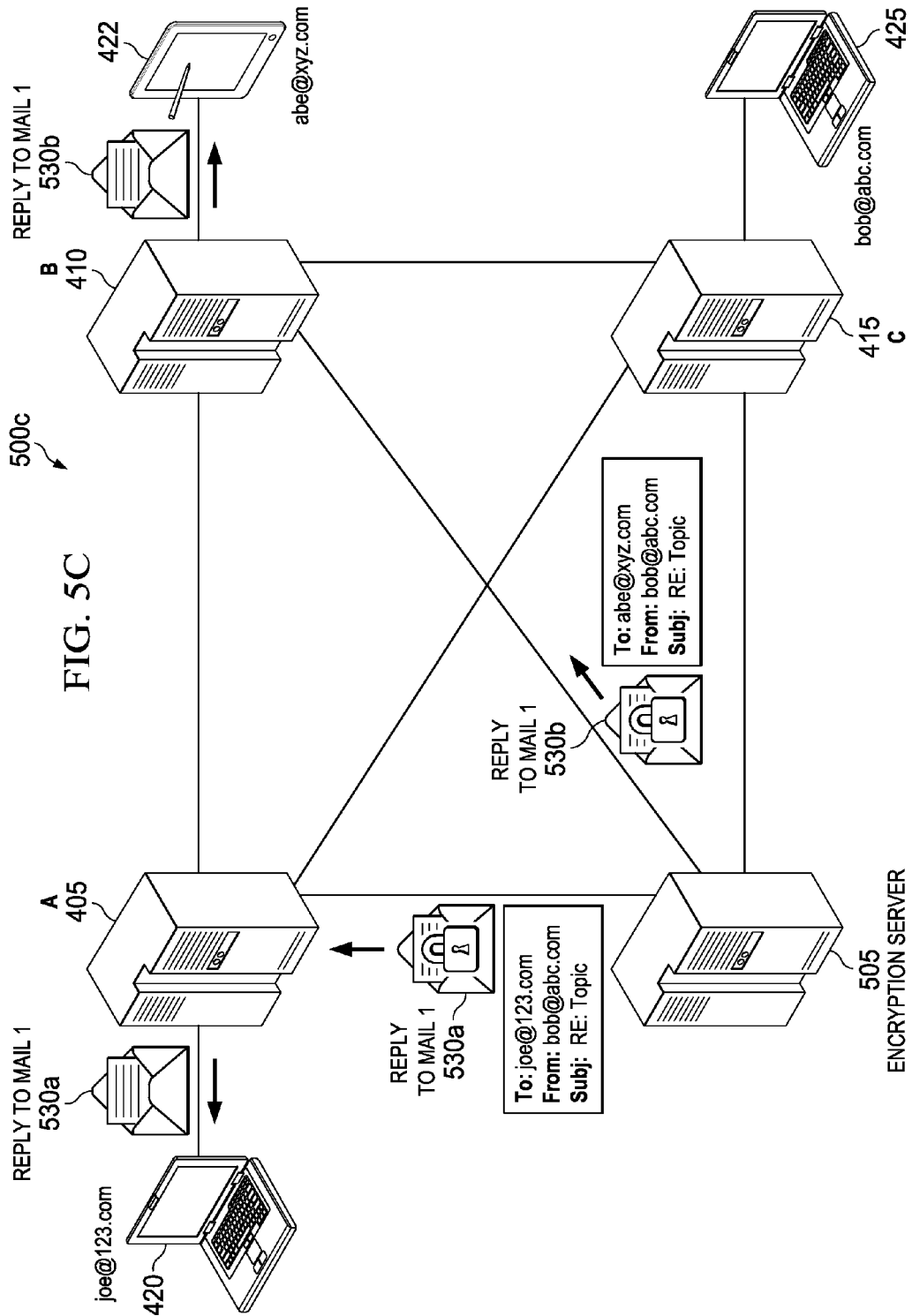

Upon receiving reply email copies 525a-b, encryption server 505 can decode the encoded address data (at 530a-b) to identify the actual email addresses of the recipients of email 525a-b. For instance, <code1> (at 530b) can be decoded by encryption server 505, resolving <code1> into the email address "abe@xyz.com." Further, <code2> (at 530a) can be decoded by encryption server 505, resolving <code1> into the email address "joe@123.com." Encryption server 505 can identify destination email servers (e.g., 405, 410) corresponding to the resolved email addresses as well as determine how to encrypt channels between encryption server 505 and the destination email servers. Turning to FIG. 5C, encryption server 505 can then route the copies 525a-b of the reply email 525 to the respective recipient servers (e.g., 405, 410) for delivery to the respective recipient client devices 420, 422.

While the examples of FIGS. 5A-5C show an encryption server 505 both encrypting emails and encoding email address data on behalf of a sender email server (e.g., 405), in other examples, at least a portion of the encryption and/or email address encoding (or decoding) can be performed by one or more email servers (e.g., 405) and an encryption server 5050 or other device in tandem. For instance, an email server 405 can possess functionality for encrypting communications between the email server 405 and other recipient email servers (e.g., 410, 415), but may delegate email address encoding and decoding to an outside server, such as encryption server 505. Other devices and functionality can be alternatively used, such as a device other than encryption server 505 that provides email address encoding and decoding services, among other examples.

It should be appreciated that the examples of FIGS. 4A-5C are non-limiting examples presented for purposes of illustrating certain general principles. Alternative use cases, configurations, participants, and functionality can be included in other examples. A potentially limitless number of variants of email servers, email clients, networks, security tools, and other components and devices can be used in connection with the principles discussed herein. As but one example, email security or encryption policies and functionality can be pre-established between all or less than all of the email servers involved in a particular set of related email communications (e.g., emails and replies thereto). Further, among other examples and implementations, a single email server can serve email for both a sender and recipient of an email. In such instances, email security tools (such as implemented on an email server 405 or encryption server 505) can pre-screen recipient email addresses to determine whether encoding of the email address data will be useful. For instance, if one of the recipients' email mailboxes is served on the same machine as the senders' email mailbox and A security tool tasked with securing replies to the sender's emails (such as on server 405 in the examples of 4A-4B), email address data corresponding to the recipient sharing a server with the email's sender may, in some implementations, be left unaltered (e.g., in instances employing a protocol allowing the email address data of the sender to remain unaltered, such as shown in the examples of FIGS. 4A-4B).

Figure 6A:
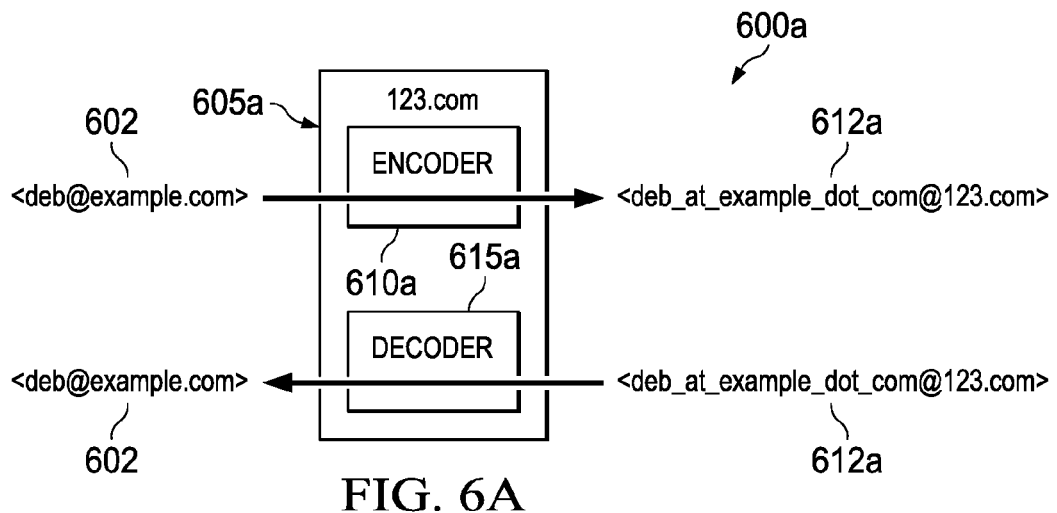
FIGS. 6A-6C are schematic illustrations of example embodiments of email address encoding.
Figure 6B:
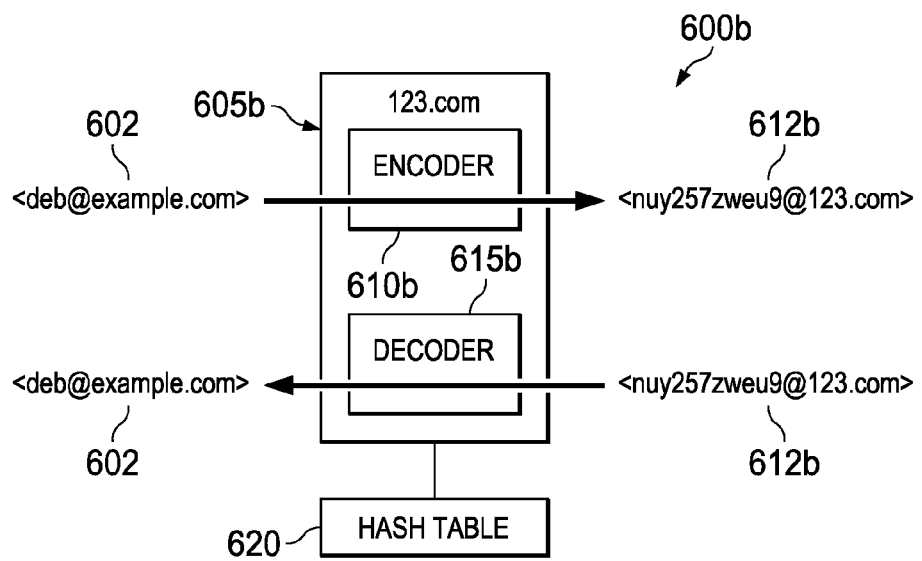
Figure 6C:
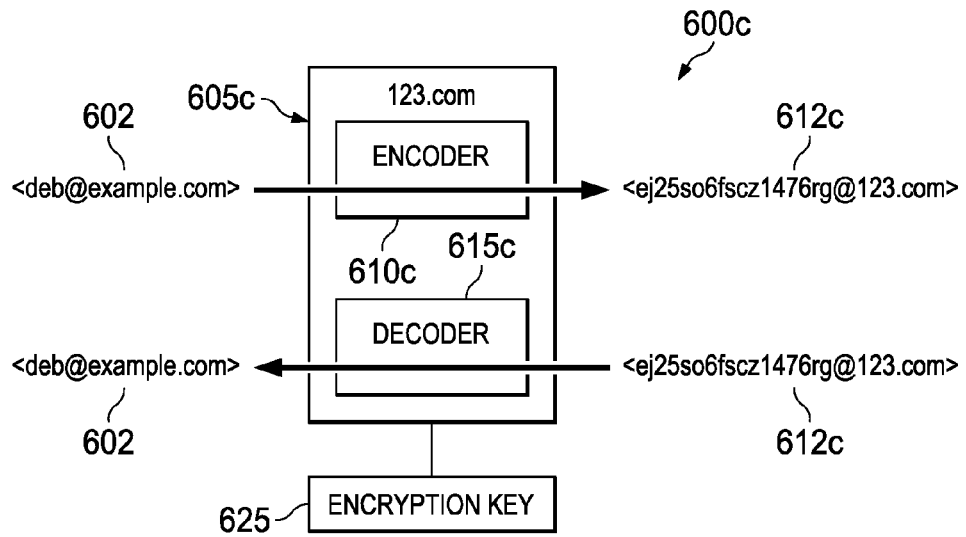

Turning to FIGS. 6A-6C, examples are presented of techniques for encoding and decoding email address data in connection with attempting to control encryption and security of replies to a particular email. For instance, as shown in FIG. 6A, a first encoding technique or policy can be applied to email address data used by recipient devices when replying the email. Email address data 602 can be processed by an encoder module 610*a* of an email server 605*a* or other device to produce an encoded version 612*a* of the email address data 602. For instance, an example actual email address "deb@example.com" can be encoded so as to change the domain part of the reply email address to a different domain (e.g., "@123.com") associated with devices (e.g., server 605*a*) capable of performing particular preferred security tasks, such as encrypted transmissions of reply emails. This can assist in causing email replies to be routed over an intermediate domain for encryption or other security purposes (such as described above, for instance, in the examples of FIGS. 4A-5C).

In addition to changing the domain part of the email address 602, encoder 610*a* can encode the local part of the email address for use in preserving the actual address of the recipient so that, upon decoding the encoded email address data, the email address of the ultimate recipient can be identified. For instance, in the particular example of FIG. 6A, portions of the original email address in email address data 602 can be incorporated in the local part itself. As an example, the original email address can be converted into a string (e.g., by transforming the "at sign" ("@") in the email address to text "_at_" and the period (".") from the domain part of the address to the text "_dot_"). For example, an original email address "deb@example.com" can be transformed into "deb_at_example_dot_com" and applied as the local part of the encoded email address data 612*a*. The encoded local part can then be concatenated with the domain part to encode the original email address data 602 to provide for replies to be re-directed through a particular encrypted channel and decoded for eventual routing to the reply recipients' email account.

In the example of FIG. 6A, the pre-encoded email address can be readily detectable within the encoded email address data (e.g., "deb_at_example_dot_com"). Other such implementations can be provided, different from the specific example of FIG. 6A, but nonetheless allowing detection of the recipient email address from the encoded email address data as well as the protocol used to convert email address data to an encoded format used by one or more email servers. However, in alternate examples, it can be desirable to obfuscate the identity of encoded address data, such as reply-to fields, as well as the encoding technique to protect against malicious third parties, such as spammers, from capturing and utilizing encoded email address data and techniques, for instance, to pose as trusted or authorized senders making use of one or more encrypted communication channels. For instance, in one example, an encoding technique can be applied that results in encoded email address data being at least partially obfuscated.

As shown in the example of FIG. 6B, a domain part of email addresses in original email address data 602 can be encoded by encoder 610*b* as in the example of FIG. 6A, changing the domain part to route the email to another device and encrypted channel prior to forwarding the reply email to its eventual destination. Further, the local part of the email addresses in email address data 602 can be hashed by encoder 610*b* to obfuscate the identities of each of the designated recipients in a reply email including the encoded email address data 612*b*. Email server 605 can associate the hashed value (e.g., "nuy257zweu9") with the corresponding email address (e.g., ""deb@example.com") in a hash table. Upon receiving replies that include the hashed email address data 612*b*, decoder 615*b* can use hash table 620 to derive the actual email address 602 and forward the email, over an encrypted channel, to the corresponding recipient (e.g., to "deb@example.com"). Other techniques can also be applied. For instance, in the example of FIG. 6C, a local part of an original email address (e.g., "deb@example.com") can be encrypted using a private encryption key 625 at email server 605 (e.g., using encoder 610*c*). Similarly, an encrypted portion of encoded email address data 612*c* can be decrypted (e.g., using decoder 615*c*), in some instances, only by email server 605 (or other holders of the key 625), allowing secure email communication channels facilitated, at least in part, by email server 605, to be controlled by email server 605. Other encoding techniques beyond those described in the illustrative examples of FIGS. 6A-6C can also be applied and still fall within the scope of the present disclosure.

Figure 7A:
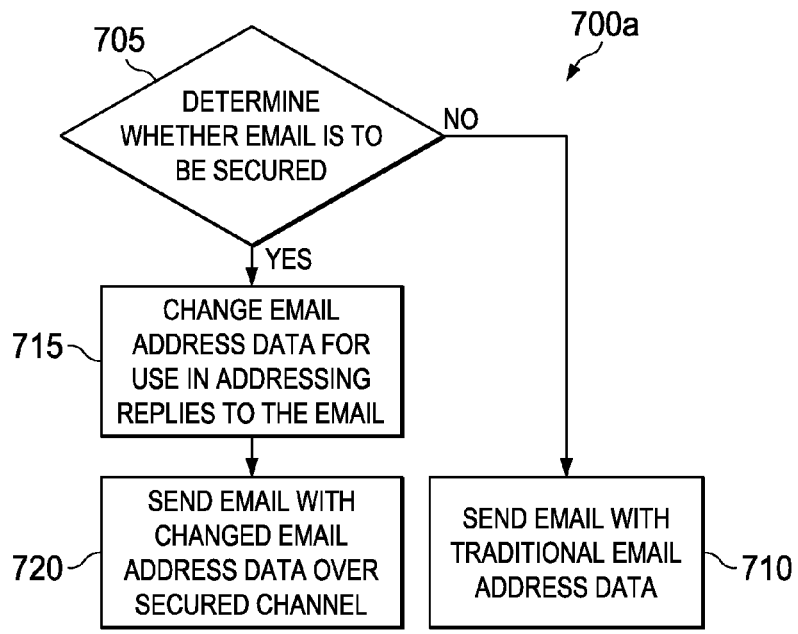
FIGS. 7A-7B are simplified flowcharts illustrating example operations associated with at least some embodiments of the system.
Figure 7B:
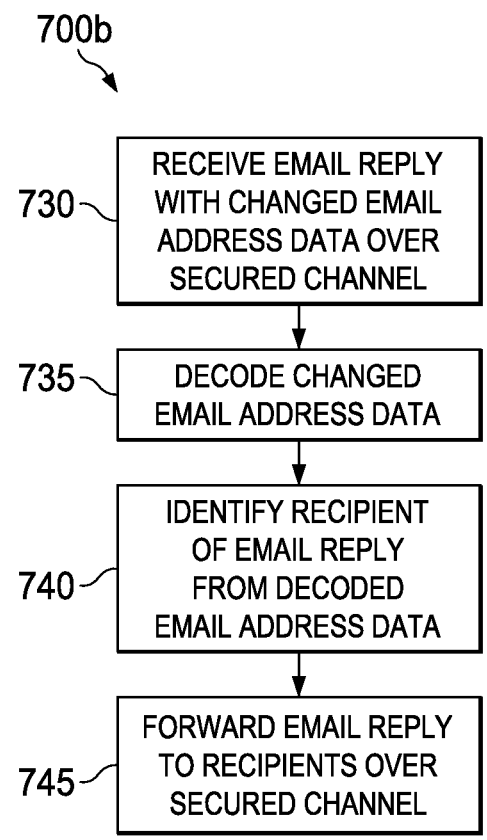

FIGS. 7A-7B are simplified flowcharts 700*a-b* illustrating example techniques for securing replies to an email communication. In FIG. 7A, a determination is made 705 whether an email is to be sent or served over a secured communication channel, such as an encrypted data stream or channel. If the email is not to be sent over a secured communication channel, the email can be sent 710 or delivered using traditional techniques, including using traditional email address data, such as reply-to data corresponding with the unmodified email addresses of the respective sender and recipients. Alternatively, if the email is to be sent over a secured channel, email address data of one or more recipients (and, optionally, the sender), including recipients that have been carbon-copied or blind-carbon-copied on the email, can be changed 715 in accordance with one or more techniques, such as those examples described in connection with FIGS. 6A-6C. The email can then be sent 720 over the secured channel, the email including the changed email address data.

Email clients receiving the sent (at 720) email can initiate replies to the email. Replies can be generated by remote clients that adopt the changed (at 715) email address data, causing the reply emails to be redirected to an intermediate server device. In some instances, the intermediate server device can be the email server of the email's original sender. Accordingly, as shown in FIG. 7B, one or all copies of a reply email can be routed to and received 730 by the intermediate server over a secured communication channel, such as an encrypted data stream. Changed email address data included in the reply email can then be decoded 735 to identify 740 the intended recipients of the reply emails, for instance using principles similar to those described in connection with the examples of FIGS. 6A-6C. The intermediate server can then forward 745 copies of the reply email to the identified recipients over one or more secured communication channels. In some instances, the secured communication channel over which the reply email is sent 745 can be the same channel or type of channel used to send (e.g., at 720) the original email that was replied to.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    determining that at least a portion of a transmission of an outgoing first email from a first email account to at least a second email account is to be encrypted, wherein the first email is to be sent by a first email server associated with the first email account and the second email account is associated with a different second email server;
    changing a reply-to address included in the first email and corresponding to the second email account to an address associated with an intermediate device, wherein replies to the first email, intended for delivery to the second email account, are to be sent to the intermediate device prior to being routed to the second email server for delivery to the second email account based on the changed reply-to address to apply encryption to replies to the first email, replies to the first email sent to the intermediate device are sent over encrypted channels, and replies to the first email routed from the intermediate device to the second email server are sent over encrypted channels; and
    causing at least a portion of a transmission of the first email to be encrypted and sent to the second email account with the changes to the reply-to address.

2. The method of claim 1, wherein the first email is to be sent to both the second email account and at least a third email account, the method further comprising:
  changing a reply-to address corresponding to the third email account to cause replies to the first email, to include the third email account as a recipient, to be sent to the intermediate device prior to being routed to the third email account; and
  causing the encrypted portion of the transmission of the first email to be sent to the third email account with the changes to the reply-to addresses.

3. The method of claim 2, wherein email transmissions are capable of being secured between a first server associated with the first email account and each of a second server associated with the second email account and a third server associated with the third email account, and at least some email transmissions are not secured between the second server and the third server.

4. The method of claim 2, further comprising:
  receiving at least one copy of a reply to the previously-sent first email from the second email account, the at least one copy including the changed reply-to address corresponding to the third email account;
  decoding at least a portion of the changed reply-to address corresponding to the third email account to identify an email address associated with the third email account; and
  causing the at least one copy to be forwarded to the third email client over a secured communication channel.

5. The method of claim 1, further comprising changing a reply-to address corresponding to the first email account to cause replies to the first email, intended for delivery to the first email account, to be sent to the intermediate device prior to being routed to the first email account.

6. The method of claim 1, wherein the intermediate device is used to serve email associated with first email account.

7. The method of claim 1, wherein the intermediate device is at least partially independent from an email server of the first email account.

8. The method of claim 1, wherein changing the reply-to address includes encoding a local portion of an email address of the second email account.

9. The method of claim 8, wherein encoding the local portion of the email address of the second email account includes hashing the email address.

10. The method of claim 8, wherein encoding the local portion of the email address of the second email account includes encrypting the email address.

11. The method of claim 8, wherein encoding the local portion of the email address of the second email account includes converting the email address into a text string.

12. The method of claim 1, wherein changing the reply-to address includes changing a domain portion of an email address of the second email account to a particular domain associated with the intermediate device.

13. The method of claim 1, wherein changing the reply-to address includes setting a reply-to email address data field to an email address corresponding to the intermediate device.

14. The method of claim 1, wherein the reply-to address is changed in response to determining that at least a portion of a transmission of an outgoing first email from a first email account to at least a second email account is to be encrypted.

15. A method comprising:
  receiving at least one copy of a user-generated reply to a previously-sent first email, the reply to be sent to a first email account hosted at a first email server, the at least one copy including encoded reply-to email address data associated with the first email account, wherein the encoded reply-to email address data causes the at least one copy to be routed to the intermediate device over a first secured communication channel to apply encryption to the at least one copy of the reply to the first email prior to the at least one copy being routed to the first email server;
  decoding at least a portion of the encoded reply-to email address data to identify an email address associated with the first email account; and
  forwarding the at least one copy from the intermediate device to the first email server over a second secured communication channel for delivery to the first email account based on the identified email address.

16. The method of claim 15, wherein at least a portion of the encoded reply-to email address data is encrypted and decoding the portion of the encoded email address data includes decrypting the encrypted portion of the encoded reply-to email address data.

17. The method of claim 15, wherein at least a portion of the encoded reply-to email address data is a hash of the email address associated with the first email client.

18. The method of claim 15, wherein the encoded reply-to email address data was generated in response to a determination that the first email was to be transmitted at least partially over a secured communication channel.

19. At least one non-transitory, machine-accessible storage medium having instructions stored thereon, the instructions when executed on a machine, cause the machine to:
  determine that at least a portion of a transmission of an outgoing first email from a first email account to at least a second email account is to be encrypted, wherein the first email is to be sent by a first email server associated with the first email account and the second email account is associated with a different second email server;
  change a reply-to address included in the first email and corresponding to the second email account to an address associated with an intermediate device, wherein replies to the first email, intended for delivery to the second email account, are to be sent to the intermediate device prior to being routed to the second email server for delivery to the second email account based on the changed reply-to address to apply encryption to replies to the first email, replies to the first email sent to the intermediate device are sent over encrypted channels, and replies to the first email routed from the intermediate device to the second email server are sent over encrypted channels; and
  cause at least a portion of a transmission of the first email to be encrypted and sent to the second email account with the changes to the reply-to address.

20. A system comprising:
at least one processor device;
at least one memory element; and
an email security engine, adapted when executed by the at least one processor device to:
  determine that at least a portion of a transmission of an outgoing first email from a first email account to at least a second email account is to be encrypted, wherein the first email is to be sent by a first email server associated with the first email account and the second email account is associated with a different second email serve;
  change a reply-to address included in the first email and corresponding to the second email account to an address associated with an intermediate device, wherein replies to the first email, intended for delivery to the second email account, are to be sent to the intermediate device prior to being routed to the second email server for delivery to the second email account based on the changed reply-to address to apply encryption to replies to the first email, replies to the first email sent to the intermediate device are sent over encrypted channels, and replies to the first email routed from the intermediate device to the second email server are sent over encrypted channels; and cause at least a portion of a transmission of the first email to be encrypted and sent to the second email account with the changes to the reply-to address.

21. The system of claim 20, further comprising an email server, the email server comprising the email security engine.

22. The method of claim 15, wherein the user-generated reply was at least partially generated in response to a user selection of a reply-all action to the first email at a second email client.

23. The method of claim 18, wherein generating the encoded reply-to email address comprises replacing, in the first email, an original reply-to address addressing the first email account with the encoded reply-to email address.

24. The method of claim 1, wherein the further comprising:
determining that at least a portion of the transmission of the outgoing first email is to be encrypted, wherein determining that at least a portion of the transmission of the outgoing first email is to be encrypted includes scanning contents of the first email to determine that a particular policy applies to the first email, and the portion of the transmission of the outgoing first email is to be encrypted according to the particular policy.

25. A system comprising:
means to determine that at least a portion of a transmission of an outgoing first email from a first email account to at least a second email account is to be encrypted, wherein the first email is to be sent by a first email server associated with the first email account and the second email account is associated with a different second email server;

means to change a reply-to address included in the first email and corresponding to the second email account to an address associated with an intermediate device, wherein replies to the first email, intended for delivery to the second email account, are to be sent to the intermediate device prior to being routed to the second email server for delivery to the second email account based on the changed reply-to address to apply encryption to replies to the first email, replies to the first email sent to the intermediate device are sent over encrypted channels, and replies to the first email routed from the intermediate device to the second email server are sent over encrypted channels; and causing at least a portion of a transmission of the first email to be encrypted and sent to the second email account with the changes to the reply-to address.

* * * * *

UNITED STATES PATENT AND TRADEMARK OFFICE
CERTIFICATE OF CORRECTION

PATENT NO. : 8,930,689 B2
APPLICATION NO. : 13/247239
DATED : January 6, 2015
INVENTOR(S) : Nicholas Liebmann et al.

It is certified that error appears in the above-identified patent and that said Letters Patent is hereby corrected as shown below:

In the Claims

In column 18, line 64, claim 20, delete "serve" and insert --server--, therefor.

In column 19, line 24, claim 24, delete "wherein the further comprising:" and insert --further comprising--, therefor.

Signed and Sealed this
Twelfth Day of May, 2015

Michelle K. Lee
*Director of the United States Patent and Trademark Office*